(12) United States Patent
Eijsbouts-Spickova et al.

(10) Patent No.: US 8,486,259 B2
(45) Date of Patent: Jul. 16, 2013

(54) BULK HYDROPROCESSING CATALYST COMPRISING A GROUP VIII METAL AND MOLYBDENUM, PREPARATION AND USE THEREOF

(75) Inventors: Sona Eijsbouts-Spickova, Nieuwkuijk (NL); Jacobus Nicolaas Louwen, Hoorn (NL); Frans L. Plantenga, Hoevelaken (NL); Robertus Gerardus Leliveld, Utrecht (NL); Sabato Miseo, Pittstown, NJ (US); Stuart Leon Soled, Pittstown, NJ (US)

(73) Assignee: Albemarle Corporation, Baton Rouge, LA (US)

( * ) Notice: Subject to any disclaimer, the term of this patent is extended or adjusted under 35 U.S.C. 154(b) by 1073 days.

(21) Appl. No.: 12/091,328

(22) PCT Filed: Oct. 25, 2006

(86) PCT No.: PCT/EP2006/010292
§ 371 (c)(1),
(2), (4) Date: Jul. 14, 2008

(87) PCT Pub. No.: WO2007/048593
PCT Pub. Date: May 3, 2007

(65) Prior Publication Data
US 2009/0139904 A1    Jun. 4, 2009

Related U.S. Application Data

(60) Provisional application No. 60/730,678, filed on Oct. 26, 2005.

(30) Foreign Application Priority Data

Jan. 23, 2006  (EP) ..................................... 06100734

(51) Int. Cl.
*C10G 45/08*    (2006.01)
*B01J 23/88*    (2006.01)

(52) U.S. Cl.
USPC ................... 208/216 R; 208/217; 208/254 H; 502/313

(58) Field of Classification Search
USPC .................................. 208/216 R, 217, 254 H
See application file for complete search history.

(56) References Cited

U.S. PATENT DOCUMENTS 6,635,599 B1 * 10/2003 Eijsbouts et al. ............. 502/305
2005/0065384 A1   3/2005 Saleh et al.

FOREIGN PATENT DOCUMENTS

| WO | WO 99/03578 A1 | 1/1999 |
| WO | WO 00/41810 A1 | 7/2000 |
| WO | WO 2004/073859 A1 | 9/2004 |
| WO | WO 2005/103206 A1 | 11/2005 |

* cited by examiner

*Primary Examiner* — Randy Boyer
(74) *Attorney, Agent, or Firm* — Jeremy J. Kliebert; Marcy M. Hoefling; James A. Jubinsky (57) ABSTRACT

The invention relates to a bulk catalyst comprising at least 60 wt % metal oxidic particles comprising one or more Group VIII metals and Group VIB metal molybdenum, comprising less than 10 mole % of a second Group VIB metal (relative to the total amount of Group VIB metals) and comprising a Group V metal in an amount less than 10 mole % (relative to the total of the Group VIB metals), which bulk catalyst has been calcined at a temperature below a temperature where the hexagonal metastable crystal structure changes to an inactive crystalline structure, preferably below 450° C. and which bulk catalyst has a metastable hexagonal phase characterized by an X-ray diffraction pattern having reflections at 33-35 and 58-61° 2θ. Preferably, the main reflections have a full width at half maximum (FWHM) of less than 2.5. The invention further relates to a process for the manufacture of the bulk catalyst, to the corresponding sulphided bulk catalyst and to the use of said catalyst or sulphided catalyst in the hydroprocessing, in particular the hydrodesulphurisation and hydrodenitrogenation, of a hydrocarbon feedstock.

15 Claims, 2 Drawing Sheets

Figure 1: XRD pattern of amorphous catalyst of comparative experiment C5:

Figure 2: XRD pattern of trimetallic catalyst of comparative experiment C4

Figure 3: XRD pattern of catalyst of example E2

BULK HYDROPROCESSING CATALYST COMPRISING A GROUP VIII METAL AND MOLYBDENUM, PREPARATION AND USE THEREOF

REFERENCE TO RELATED APPLICATIONS

This application is the National Stage of International Patent Application PCT/EP2006/010292, filed on Oct. 25, 2006, which application claims priority from U.S. Application No. 60/730,678, filed Oct. 26, 2005, the disclosures of which are incorporated herein by reference.

The invention relates to a bulk catalyst comprising at least 60 wt % metal oxidic particles comprising a Group VIII metal and Group VIB metal molybdenum. The invention further relates to a process for the manufacture of the bulk catalyst, to the corresponding sulphided bulk catalyst and to the use of said catalyst or sulphided catalyst in the hydroprocessing, in particular the hydrodesulphurisation and hydrodenitrogenation, of a hydrocarbon feedstock.

The bulk catalyst according to the invention usually is in the form of shaped particles, for example produced by extrusion of a composition comprising the metal oxidic particles and 0-40 wt % (relative to the total weight of the bulk catalyst) of an additional material, in particular a binder. A bulk catalyst is distinguished from a supported catalyst in that it does not comprise a preformed carrier material. The metal oxides are not deposited on the preformed carrier material, but are present as metal oxidic particles in a shaped catalyst. The bulk catalyst is further distinguished from supported catalysts in that the bulk catalyst comprises at least 60 wt % of metal oxidic particles (wt % calculated on the basis of metal oxides relative to the total weight of the bulk catalyst) whereas supported catalysts have metal oxides deposited on a support material in amounts significantly less than 60 wt %. The bulk catalyst is most preferably bimetallic, that is substantially having only molybdenum as the Group VIB metal. Details of the composition of the bulk catalyst are described below.

The term "hydroprocessing or hydrotreatment" in this context generally encompasses all processes in which a hydrocarbon feed is reacted with hydrogen at elevated temperature and elevated pressure, including processes such as hydrogenation, hydrodesulphurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. Hereafter, when referring to a high activity of the bulk catalyst according to the invention, in particular the hydrodenitrogenation activity is implied unless otherwise indicated.

Supported bimetallic catalysts and their use in hydrotreatment of hydrocarbon feedstock are long known in the art. GB 820536 describes a process for the manufacture of mechanically strong supported catalyst particles comprising combinations of cobalt, nickel, molybdenum, vanadium or tungsten in which a spray-dried alumina hydrate microspherical carrier material is used in an amount between 60 and 99 wt % relative to the total weight of the catalyst. The catalysts are calcined at high temperature, for example, in Example 1 at 566° C.

Bimetallic nickel molybdenum bulk catalysts are described in the prior art. However, they are described as being inferior to the trimetallic bulk catalysts which comprise two instead of only one group VIB metals.

WO 00/41810 describes trimetallic bulk catalysts comprising bulk catalyst particles comprising at least one group VIII metal and at least two group VIB metals, in particular nickel/molybdenum/tungsten based catalysts. The trimetallic bulk catalyst particles are prepared in a process in which the metal compounds are combined in the presence of a protic liquid and wherein at least one of the metal compounds remains at least partly in the solid state during the entire process. In comparative example A, a nickel-molybdenum bulk catalyst is described prepared by reacting one solid compound comprising the group VIII metal and one solute compound comprising the group VIB metal. The obtained oxidic metal particles were calcined at 400° C. The obtained trimetallic bulk catalysts have a significantly higher catalytic activity than the bimetallic bulk catalyst described in the comparative examples A and B.

WO 00/41811 describes a trimetallic bulk hydroprocessing catalysts and a process for the manufacture thereof comprising the steps of combining and reacting at least one group VIII metal compound in solution with at least two group VIB metal compounds in solution in a reaction mixture to obtain a precipitate. The obtained oxidic metal particles were calcined at 400° C. In comparative example 2 a bimetallic bulk catalyst (cobalt/molybdenum) is described, The obtained trimetallic bulk catalysts have a significantly higher catalytic activity than the bimetallic bulk catalyst.

EP2005/004265 (not prepublished) describes trimetallic bulk hydroprocessing catalysts comprising a group VIII metal, in particular nickel, cobalt, iron or mixtures thereof, a group VIB metal in particular molybdenum, tungsten or mixtures thereof, and a group V metal in a prescribed metal molar ratio. The molar ratio of group VIB metals to group V metals and generally ranges between 0.1 and 1, preferably between 0.3 and 3.

WO 99/03578 describes a trimetallic hydrotreating bulk catalyst in which at least a portion but less than all of the molybdenum in the nickel molybdenum catalyst is replaced by tungsten. The catalyst is prepared by decomposing (boiling decomposition) a nickel (ammonium) molybdotungstate precursor from a solution or direct precipitation of the dissolved metal salts from the solution. The comparative examples described a bimetallic nickel-molybdenum bulk catalyst ($NH_4$ $Ni_1Mo_1$—O) that was prepared by the boiling decomposition of a solution of the ammonium metal complex. The obtained oxidic metal particles were calcined at 400° C. The obtained trimetallic bulk catalysts have a significantly higher catalytic activity than the bimetallic bulk catalyst.

WO 2004/073859 describes a process for the manufacture of bulk metal oxide catalyst comprising one or more metals of group VIII and one or more metals of group VIB in their oxide or sulphide form and a refractory oxide. The process involves controlled precipitation of metal compounds, refractory oxide material and alkali compound (preferably ammonia containing compounds) in a protic liquid, forming an ammonium complex of the metal and refractory oxide materials which is subsequently heated. The examples disclose bimetallic nickel molybdenum catalysts. It is claimed that the prior art process results in bulk catalysts which are substantially amorphous, characterized in that there is no reflection in the X-ray diffraction pattern having a characteristic full width at half maximum of 2.5° or less.

WO 2005/005582 describes a process to prepare lubricating base oil using a hydroprocessing bulk catalyst comprising one or more metals of group VIII and one or more metals of group VIB in their oxide or sulphide form and a refractory oxide. The bulk catalysts described in the examples are bimetallic, in particular nickel-molybdenum and nickel-tungsten, and are prepared by reacting one solid compound comprising the group VIII metal and one solute compound comprising the group VIB metal in the presence of the refractory metal after addition of ammonium solution. It is described that the structure of the obtained oxidic particles were amorphous by XRD analysis.

The above prior art reference make clear that trimetallic bulk catalysts have a higher activity in hydrodesulphurisation compared to bimetallic bulk catalysts. However, trimetallic catalysts have the disadvantage over bimetallic catalysts that, because of the presence of two different group VIB metal compounds, the production process is more complicated. A further distinct disadvantage of the trimetallic catalysts is that it is difficult to reclaim the metals from the spent (or used) catalysts, because it is difficult to separate two different group VIB metals with a high yield. The main objective of the invention is to provide a catalyst that has a high hydrodesulphurisation and hydrodenitrogenation activity, is able to reach very low levels of residual sulphur and nitrogen in treated feedstock and is relatively simple to produce and to recycle to the constituent metals.

According to the invention there is provided a bulk catalyst comprising at least 60 wt % metal oxidic particles comprising one or more Group VIII metals and Group VIB metal molybdenum, comprising less than 10 mole % of a second Group VIB metal (relative to the total amount of Group VIB metals) and comprising a Group V metal in an amount less than 10 mole % (relative to the total of the Group VIB metals), which bulk catalyst has been calcined at a temperature below a temperature where the hexagonal metastable crystal structure changes to an inactive crystalline structure, preferably below 450° C., which bulk catalyst has a metastable hexagonal phase characterized by an X-ray diffraction pattern having reflections at 33-35 and 58-61° 2θ. This phase is referred to as metastable hexagonal phase even though the structure in fact may slightly deviate from the strict hexagonal structure. These reflections are reasonably well resolved.

It was surprisingly found that the catalyst according to the invention has in particular a high activity in hydrodenitrogenation of diesel (hereafter good and better in this context in particular means: a bulk catalyst with high or higher hydrodenitrogenation activity). The catalyst according to the invention achieves very low residual nitrogen levels. Hydrodenitrogenation activity, especially when expressed per unit weight was found to be very high when compared to the prior art trimetallic bulk catalyst. Even when compared on the basis of volume activity (or residual nitrogen content), the activity is still good. The bulk catalyst according to the invention is particularly useful for use in combination with a hydrodesulphurisation catalyst.

In view of the teaching of prior art WO 2004/073859 it was surprising to find that such high activity could be found in a catalyst that is not amorphous, but instead has distinct crystallographic features. The bulk catalyst according to the invention has a metastable hexagonal structure having an X-ray diffraction pattern showing two reasonably well-resolved reflections, one between 33 and 35, the other between 58 and 61° and the main reflections preferably have a full width at half maximum (FWHM) of less than 2.5.

It is considered, that apart from the metastable hexagonal phase some amorphous phases may be present as well in the catalyst according to the invention. However, as the presence of the metastable hexagonal phase appeared to be indicative of a high catalytic activity, it is preferred, as opposed to the amorphous catalyst described prior art WO 2004/073859, that the bulk catalyst according to invention has an XRD pattern wherein the main reflections have a full width at half maximum (FWHM) of less than 2.5. An FWHM of less than 2.0 or even less than 1.5 is often observed.

US2005/0065384 describes a process for the hydrogenation of oxoaldehydes. The catalyst in this process is a reduced Nickel molybdenum bulk catalyst as opposed to the present invention which is an oxidic bulk catalyst. This document also describes the oxidic intermediate of said reduced catalyst. However, the catalyst according to the invention is novel over this prior art catalyst in that it has been calcined at a temperature below a temperature where the hexagonal metastable crystal structure changes to an inactive crystalline structure, preferably below 400° C. As opposed to the prior art, the catalyst according to the invention further is a hydroprocessing catalyst which, before use in a hydroprocessing process, is presulphided in situ or ex-situ preferably by presulphided via liquid phase, preferably by a spiked hydrocarbon feed.

It was found that the metal oxidic particles in the bulk catalyst according to the invention are particularly sensitive to heat treatment. It is important that the bulk catalyst, in particular the metal oxidic particles in the bulk catalyst, have been heat treated at a temperature below a temperature where transition to a crystalline structure occurs. This applies to any and all heat treatment steps in the production process of the bulk catalyst, in particular to drying and calcinations of the metal oxidic particles or of the shaped bulk catalyst particles after compositing and shaping. Preferably, the bulk catalyst is heat treated below 450° C., more preferably below 400° C., even more preferably below 375° C. and most preferably below 350° C. When in this context reference is made to "transition to a crystalline structure", a crystal structure other than the metastable hexagonal phase is meant. The inactive high temperature crystal structure is believed to be beta-$NiMoO_4$ or alpha-$NiMoO_4$.

The bulk catalyst according to the invention substantially comprises only molybdenum is as the Group VIB metal. The bulk catalyst may optionally further comprise a second Group VIII metal, for example nickel and cobalt but most preferably also has only one Group VIII metal, preferably nickel. The bulk catalyst may optionally further comprise less than 10 mole % of a second Group VIB metal (relative to the total amount of Group VIB metals). It is most preferred that the bulk catalyst essentially comprises only nickel and molybdenum. The bimetallic bulk catalyst can be distinguished from the prior art trimetallic catalyst in that it comprises less than 10 mole % of a second group VIB metal (relative to the total amount of Group VIB metals) but preferably comprises substantially only one Group VIB metal molybdenum. The term "substantially only one group VIB or group VIII metal" implies that the catalyst most preferably has no other, but may have an insubstantial amount of another Group VIB or group VIII metal, preferably less than 5, more preferably less than 3 and most preferably less than 1 mole % (relative to the total of the group VIB or group VIII metals).

The bulk catalyst may optionally further comprise less than 10 mole % of a Group V metal (relative to the total of the Group VIB metals). This distinguishes over not-prepublished application EP2005/004265 describing bulk catalysts including NiMo bulk catalysts comprising a group V metal in amounts generally between 10 and 90 mole % (relative to the total of the Group VIB metals). In a special embodiment, the bulk catalyst according to the invention comprises a Group V metal, preferably Niobium, in an amount between 0.1 and 10 mole % (relative to the total of the Group VIB metals), preferably between 0.1 and 9 mole %, even more preferably between 0.1 and 7 mole %. Good results can even be obtained with a Group V metal in an amount between 0.1 and 5 mole %. The group V metal was found to increase the activity even when present in relatively low amounts.

In the bulk catalyst according to the invention, the Group VIII to Group VIB metal molar ratio (hereafter referred to as the metal molar ratio), in particular nickel to molybdenum molar ratio, can in principle vary between wide ranges, for example between 0.2 and 5. Generally good results can be obtained with a metal molar ratio between 0.2 and 4. However, it was observed that at a low Ni/Mo ratio, typically between 0.2 and 1.5, very often the hexagonal metastable structure was not or not fully obtained and/or the FWHM (of the metastable hexagonal phase reflections) was more than 2.5. Often it was observed that the samples were very crystalline with a large number of peak maxima at different positions, possibly due to some raw materials still present or to other crystal structures of inactive compounds. One of the inactive compounds was identified as a phase analogous to phase I given in: P. Ricol, Comptes Rendus, vol. 256, 1963, 3125-3127." Any hexagonal phase if present could hardly be found among all the other crystalline peaks. It was also observed that in this Ni/Mo metal molar ratio range the activity was significantly lower. The lower boundary of the metal molar ratio may depend on specific process conditions used, but it is generally preferred that the Group VIII to Group VIB metal molar ratio, in particular the nickel to molybdenum molar ratio is above 1.5, more preferably above 2, even more preferably above 2.5 and most preferably above 3. It is noted that also this observation contrasts with the teaching of prior art WO 2004/073859, which describes that the Ni/Mo metal molar ratio generally is between 1 and 2 and most preferably 1.

It was further found that, where at low metal molar ratio it appeared difficult if not impossible to obtain a good catalyst in the standard atmospheric reaction conditions as described above, it was possible to obtain a good catalyst in a hydrothermal process wherein the reaction is done in hydrothermal conditions at a reaction temperature above the atmospheric boiling temperature of the protic liquid. In hydrothermal conditions it is preferred that the protic liquid is water and the reaction is done in hydrothermal conditions at a reaction temperature above 100° C., preferably at a reaction pressure higher than 1 bar. The invention also relates to a bulk catalyst according to the invention having nickel to molybdenum molar ratio between 0.2 and 5 obtainable by this hydrothermal process.

For many reasons water is the best choice for the protic liquid. However, other protic liquids are not excluded and therefore the "hydrothermal reaction conditions" in this context is intended to also cover reaction conditions using a protic liquid other than water at a pressure above atmospheric pressure and at temperatures above the boiling temperature of the protic liquid. The reaction temperature preferably is at least 10%, more preferably at least 25%, even more preferably at least 50%, and most preferably at least 75% higher than the boiling temperature of the protic liquid. The reaction is preferably done in water as the protic liquid at a reaction temperature of at least 110, preferably at least 125, even more preferably at least 150, and most preferably at least 175° C. preferably in an autoclave preferably under autogenic elevated pressure. Good results can be obtained at reaction temperatures between 110° C. and 170° C. In a preferred embodiment of the invention the reaction mixture is heated with microwave radiation. Solute components in the reaction mixture may increase the boiling temperature of the protic liquid. Preferably, in view of achieving a high activity in these hydrothermal conditions the group VIII to Group VIB metal molar ratio is more than 0.3, preferably more than 0.4, more preferably more than 0.5, even more preferably more than 0.6 and most preferably more than 0.7.

The bulk catalyst comprises at least 60 wt % of metal oxidic particles (wt % calculated on the basis of metal oxides relative to the total weight of the bulk catalyst) as distinguished from supported catalysts that have metal oxides deposited on a support material in amounts significantly less than 60 wt %. Preferably, the bulk catalyst according to the invention comprises at least 70 wt %, more preferably at least 75 wt %, even more preferably at least 80 wt % and most preferably at least 85 wt % metal oxidic particles, the remaining 0 to 40 wt % preferably being one or more materials selected from the group of binder materials, conventional hydroprocessing catalysts, acidic promoters and cracking component. Typically, after compositing of the metal oxidic particles with a binder, the composition is shaped, preferably extruded, to form shaped bulk catalyst particles. The invention also relates to shaped bulk catalyst particles comprising the metal oxidic particles. Alternatively, the metal oxidic bulk catalyst particles can be used directly in a hydrotreatment process, that is without substantial compositing and shaping e.g. by spray-drying. This is referred to as a slurry hydrotreatment process. For this use, the particles are preferably treated to obtain a narrower particle size distribution, for example by sieving or agglomerating, but without substantial compositing and shaping. The invention also relates to the use of metal the catalyst according to the invention in a slurry hydrotreatment process, preferably using metal oxidic bulk catalyst particles without substantial compositing and shaping.

Step i)

In the first step of the process for preparing the bulk catalyst according to the invention the reaction compounds are combined to form a reaction mixture. This can be done in a variety of different ways as for example described in WO 00/41810, WO 99/03578, WO 2004/073859, WO 2005/005582 and WO 00/41811. The first and/or second compounds can be soluble or at least partly insoluble in the protic liquid. It is possible to first prepare a suspension or solution of a metal compound in the protic liquid and to add, simultaneously or one after the other, solution(s) and/or further suspension(s) comprising dissolved and/or suspended metal compound(s) in the protic liquid. It is also possible to first combine solutions either simultaneously or one after the other and to subsequently add further suspension(s) and optionally solution(s) either simultaneously or one after the other.

However, in a preferred embodiment the process for the manufacture of the bulk catalyst according to the invention comprises i) preparing a reaction mixture of a first metal compound comprising Group VIII metal and a second metal compound comprising Group VIB metal molybdenum, optionally comprising one or more further compounds comprising a second Group VIB metal in an amount less than 10 mole % (relative to the total amount of Group VIB metals) and/or a Group V metal in an amount less than 10 mole % (relative to the total of the Group VIB metals) and/or a second Group VIII metal in a protic liquid and ii) reacting the first and second metal compounds at elevated temperature whereby the first and/or the second solid metal compounds remain at least partly in the solid state during the entire reaction to form the metal oxidic particles, wherein the bulk catalyst in all stages during its preparation remains at a temperature below a temperature where the hexagonal metastable crystal structure changes to an inactive crystalline structure, preferably below 400° C.

Preferably in this process the first metal compound and the second metal compound remain at least partly in the solid state during the entire reaction. This preferred process is referred to as the solid-solid process. This process is relatively simple, has a high yield and is environmentally friendly, but most importantly the bulk catalyst obtainable by said process was found be highly active. The term "at least partly in the solid state" means that at least part of the metal compound is present as a solid metal compound and, optionally, another part of the metal compound is present as a solution of this metal compound in the protic liquid. This solid-solid process is described in detail in WO 00/41810 as one of several possible preparation routes to prepare trimetallic bulk catalyst.

Preferably, in view of achieving a high yield and low environmental burden, the first and second solid metal compounds are free from nitrogen atoms and wherein the protic liquid separated from the reacted metal oxidic particles is re-used at least in part to form the slurry in step i). Most preferably, in this process the first metal compound is a metal (hydroxy) carbonate and the second metal compound is a metal oxide or acid. In view of obtaining a highly active catalyst it is further preferred that in the process the first compound is a Nickel carbonate or hydroxy carbonate having a surface area of at least 150 $m^2/g$. For several reasons, this preferred process meets the highest standard of environmentally friendly and economically optimal catalyst production. Apart from the fact that the metal compounds do not contain nitrogen atoms, also the reaction does not require addition of ammonia to the reaction mixture, as for example in WO 2004/073859, so the process is entirely free of nitrogen atoms. There is no accumulation of alien ions like ammonium and/or nitrate in the protic liquid on repeated recycling, there is no strict need for washing the obtained separated oxidic particles, there is less environmental burden because of reduced heavy transition metals waste and there is no danger of explosions due to ammonium nitrate salt formation. Further, because the catalyst is bimetallic, the chemistry in the reaction step is simpler, as there is only one group VIB metal there can be no composition drift in the group VIB metals on recycling of the separated liquid after reaction. Because the compounds remain at least partly solid during the entire reaction the amount of metals dissolved in the protic liquid is small and hence losses are smaller. Furthermore, the spent bimetallic catalyst is easier to recycle to the constituent metals than the trimetallic catalyst because there is no need to separate two group VIB metals, which is very difficult. Conventional processes for the separation of nickel and molybdenum can be used. This is advantageous in terms of reduced recycling process complexity, costs and increased metal recovery yield.

In an alternative embodiment, the manufacture of the bulk catalyst is prepared in a process comprising i) forming a solution of a first soluble metal compound comprising Group VIII metal and a second soluble metal compound comprising Group VIB metal molybdenum, the solution optionally further comprising a further compound comprising a second Group VIB metal in an amount less than 10 mole % (relative to the total amount of Group VIB metals) and optionally a compound comprising a Group V metal compound in an amount less than 10 mole % (relative to the total of the Group VIB metals) and optionally a second Group VIII compound and ii) reacting and/or precipitating the first and second metal compounds to form the metal oxidic particles, wherein the bulk catalyst in all stages during its preparation remains at a temperature below a temperature where the hexagonal metastable crystal structure changes to an inactive crystalline structure, preferably below 400° C.

The reaction time is chosen sufficiently long to substantially complete the reaction. The reaction is complete when the x-ray diffractogram of the separated metal oxidic particles does not show reflections of the unreacted starting compounds. In any case, the reaction time is chosen such that the final bulk catalyst after drying, shaping and calcining does not show reflections of the unreacted starting compounds. In route preparation routes where at least one or all of the reaction compounds are at least partly in the solid state during the entire reaction, the reaction is typically carried out for a time of at least 2 hours, preferably at least 4 hours, more preferably at least 6 hours and most preferably at least 8 hours. A particular advantage of the hydrothermal reaction process is that reaction rate of the metal compounds is higher or reversely that in principle a higher yield can be obtained within the same reaction time. This is advantageous especially when a low Group VIII to Group VI metal molar ratio is wanted because a low metal ratio was found to reduce the reaction rate during the preparation.

In general, the step of slurrying and combining the raw materials is not critical, providing that a sufficient amount of solvent is present to ensure that the slurry can be well stirred. Moreover, in case of very reactive and/or partly soluble raw materials, it should be prevented that the raw materials react vigorously already during their addition. This can again be achieved by e.g. increasing the amount of solvent or by lowering the temperature at which the raw materials are combined. A person skilled in the art should be able to choose suitable conditions.

The process further optionally comprises one or more of the following usual process steps: iii) separating the metal oxidic particles from the reaction mixture, iv) compositing the metal oxidic particles with 0 to 40 wt % of one or more materials selected from the group of binder materials, conventional hydroprocessing catalysts, acidic promoters and cracking compounds before, during or after the combining and/or reacting of the metal compounds, v) spray-drying, (flash) drying, milling, kneading, slurry-mixing, dry or wet mixing, or combinations thereof, shaping, vi) shaping, vii) drying and/or thermally treating at a temperature below a temperature where transition to a crystalline structure occurs, preferably below 400° C. and vii) sulphiding.

The invention further relates to a bulk catalyst obtainable by the above described process according to the invention, to a sulphided bulk catalyst comprising a bulk catalyst according to the invention, to the use of the bulk catalyst or the sulphided bulk catalyst for hydroprocessing of a hydrocarbon feedstock comprising sulphur and nitrogen containing organic compounds and to a method for ultra deep hydrodesulphurisation of a sulphur and nitrogen containing hydrocarbon feed comprising contacting the feed with the (un)sulphided bulk catalyst according to the invention. The bulk catalyst according to the invention is particularly useful for use in combination with a very good hydrodesulphurisation catalyst. The high hydrodenitrogenation activity and ultra low residual nitrogen levels allow a hydrodesulphurisation catalyst to achieve lower residual sulphur levels. The residual nitrogen level, that is the amount of nitrogen (in ppmwt) after the hydrotreatment using the catalyst, is below 10, preferably below 5, more preferably below 2, even more preferably below 1 ppmwt. This particularly applies to diesel where the starting level of N is low, but also to the pre-treatment of the feed for the hydrocracking unit, where the starting level of N is often high, and to hydrotreatment under higher pressure condition, for example at a pressure above 20 bar, more preferably above 30 bar and most preferably above 40 bar.

The bulk catalyst of the invention is particularly suitable for hydrotreating hydrocarbon feedstocks. Such hydrotreating processes comprise, e.g., hydrodesulphurization, hydrodenitrogenation, and hydrodearomatization of hydrocarbon feedstocks. Suitable feedstocks are, e.g., middle distillates, kero, naphtha, vacuum gas oils, and heavy gas oils.

Conventional process conditions can be applied, such as temperatures in the range of 250°-450° C., pressures in the range of 5-250 bar, space velocities in the range of 0.1-10 h-1, and H2/oil ratios in the range of 50-2000 Nl/l. The bulk catalyst according to the invention can be used in virtually all hydroprocessing processes to treat a plurality of feeds under wide-ranging reaction conditions, e.g., at temperatures in the range of 200° to 450° C., hydrogen pressures in the range of 5 to 300 bar, and space velocities (LHSV) in the range of 0.05 to 10 h-1.

Characteristic Full Width at Half Maximum

The characteristic full width at half maximum FWHM of the oxidic catalysts was determined on the basis of the X-ray diffraction pattern of the catalyst: the FWHM is the full width at half maximum (in terms of 2θ scattering angle) of the reflection between 33 and 35 and the one between 58 and 61. For the determination of the X-ray diffraction pattern, a standard powder diffractometer equipped with a graphite monochromator can be used. The measurement conditions can, e.g., be chosen as follows: X-ray generator settings: 40 kV and 40 mA, wavelength: 1.5418 angstroms, divergence and anti-scatter slits: v20 (variable), detector slit: 0.6 mm, step size: 0.05 (°2θ), time/step: 2 seconds, Instrument: Bruker D5000. To determine the maximum of the reflections, the measured CRD pattern are baseline corrected and/or corrected for background scattering as is known to the skilled man.

The invention will be further illustrated by the Examples described below. R3 means a reaction process wherein both the first and second metal compounds are at least partly solid during the reaction. R2 means a reaction route wherein at least one of the first or second metal compounds is at least partly solid during the reaction and the other compounds are is dissolved. CBD means compacted bulk density of the catalyst. The diesel hydroprocessing test results are given in Table 9 wherein RVA and RWA are relative volume activity and relative weight activity, respectively, based on the total catalyst amount loaded in the reactor. HDN is hydrodenitrogenation and HDS is hydrodesulphurisation. The tests were performed using two different temperature and pressure test conditions 1 and 2. The postfix 1 or 2 (for example in RWA1 and RWA2) refer to the test condition 1 and 2 respectively. In the tests different diesel test procedures were used indicated as D1, D2, D3 and D4. The RWA/RVA values of the reference catalysts C3, C1, C2 in diesel test procedures D1, D2, D3 respectively, were defined as 100. All other RWA/RVA values are calculated relative to these reference catalysts. These test conditions and diesel test procedure are described in more detail below. The RWA HDN1 results are not shown because the nitrogen levels in the reaction product were all so low that the measurement is inaccurate and differences between the samples are too small to identify differences in catalytic activity between samples. Further, the residual nitrogen and sulphur levels after the hydrotreatment were determined and given in Table 9 under column S1, S2 and N2.

Diesel Test Procedure D1

The catalysts were tested in a down-flow tubular reactor. Each reactor tube contained 10 ml of catalyst mixed with an equal amount of SiC particles and sandwiched between layers of SiC particles. Before being tested the catalysts were presulphided via liquid phase presulphiding using the feed described in Table 1, which had been spiked with dimethyl disulfide to a total sulfur content of 3.7 wt. %. The presulphided catalysts were then tested in the hydrotreating of a diesel feedstock having the properties shown in Table 1:

TABLE 1

|  | GAS OIL FEEDSTOCK |
|---|---|
| Sulphur content (% wt) | 1.24 |
| Nitrogen content (ppmwt) | 86 |
| Mono aromatics (% wt) | 16.5 |
| Di-aromatics (% wt) | 10.8 |
| Di+-aromatics (% wt) | 0.8 |
| Total aromatics (% wt) | 28.1 |
| Simulated Distillation ASTM-D 86 | |
| Initial Boiling Point | 184 |
| 5% Volume (° C.) | 218.6 |
| 10% Volume (° C.) | 231.1 |
| 20% Volume (° C.) | 250.9 |
| 30% Volume (° C.) | 264.8 |
| 40% Volume (° C.) | 276.4 |
| 50% Volume (° C.) | 286.8 |
| 60% Volume (° C.) | 298.1 |
| 70% Volume (° C.) | 309.7 |
| 80% Volume (° C.) | 324.7 |
| 90% Volume (° C.) | 345.3 |
| 95% Volume (° C.) | 360.3 |
| Final Boiling Point (° C.) | 373.8 |

The catalysts were tested under the two conditions shown in Table 2.

TABLE 2

|  | Presulphiding | Condition 1 | Condition 2 |
|---|---|---|---|
| Temperature (° C.) | 315 | 320 | 340 |
| Pressure (bar) | 30 | 40 | 20 |
| H2 to oil ratio (Nl/l) | 200 | 300 | 300 |
| LHSV (1/h) | 3.0 | 2.0 | 1.5 |

Diesel Test Procedure D2

The catalyst was loaded into the reactor in a manner analogous to what is described in D1. Before being tested the catalysts were presulphided via liquid phase presulphiding using the feed described below in Table 3, which had been spiked with dimethyl disulfide to a total sulfur content of 3.7 wt. %. The presulphided catalysts were then tested in the hydrotreating of a diesel feedstock having the properties shown in Table 3:

TABLE 3

|  | GAS OIL FEEDSTOCK |
|---|---|
| Sulphur content (% wt) | 1.23 |
| Nitrogen content (ppmwt) | 85 |
| Mono aromatics (% wt) | 16.6 |
| Di-aromatics (% wt) | 11.1 |
| Di+-aromatics (% wt) | 0.7 |
| Total aromatics (% wt) | 28.4 |
| Simulated Distillation ASTM-D 86 | |
| Initial Boiling Point | 180 |
| 5% Volume (° C.) | 220 |
| 10% Volume (° C.) | 233 |
| 20% Volume (° C.) | 250 |
| 30% Volume (° C.) | 262 |
| 40% Volume (° C.) | 273 |
| 50% Volume (° C.) | 284 |

TABLE 3-continued

| | GAS OIL FEEDSTOCK |
|---|---|
| 60% Volume (° C.) | 295 |
| 70% Volume (° C.) | 307 |
| 80% Volume (° C.) | 321 |
| 90% Volume (° C.) | 341 |
| 95% Volume (° C.) | 345 |
| Final Boiling Point (° C.) | 354 |

The catalysts were tested under the two conditions shown in Table 4.

TABLE 4

| | Presulphiding | Condition 1 | Condition 2 |
|---|---|---|---|
| Temperature (° C.) | 315 | 315 | 340 |
| Pressure (bar) | 45 | 45 | 20 |
| H2 to oil ratio (Nl/l) | 200 | 200 | 200 |
| LHSV (1/h) | 3.0 | 1.5 | 1.5 |

Diesel Test Procedure D3

The catalyst was loaded into the reactor in a manner analogous to what is described in D1. Before being tested the catalysts were presulphided via liquid phase presulphiding using the feed described below in Table 5, which had been spiked with dimethyl disulfide to a total sulfur content of 3.7 wt. %. The presulphided catalysts were then tested in the hydrotreating of a diesel feedstock having the properties shown in Table 5:

TABLE 5

| GAS OIL FEEDSTOCK | |
|---|---|
| S (wt. %) | 1.2 |
| N (ppmwt) | 84 |
| total aromatics (wt. %) | 27.8 |
| polynuclear aromatic (PNA) (wt. %) | 11.7 |
| mono-aromatics (wt. %) | 16.5 |
| di-aromatics (wt. %) | 10.8 |
| tri+-aromatics (wt. %) | 0.8 |
| Simulated distillation ASTM-D 86 | |
| Initial boiling point | 184° C. |
| 5 vol. % | 218° C. |
| 10 vol. % | 231° C. |
| 30 vol. % | 265° C. |
| 50 vol. % | 287° C. |
| 70 vol. % | 310° C. |
| 90 vol. % | 345° C. |
| Final boiling point | 374° C. |

The catalysts were tested under the two conditions shown in Table 6:

TABLE 6

| | Presulfiding | Condition 1 | Condition 2 |
|---|---|---|---|
| Temperature (° C.) | 320 | 330 | 340 |
| Pressure (bar) | 40 | 40 | 20 |
| H2 to oil ratio (Nl/l) | 300 | 300 | 300 |
| LHSV (1/h) | 3.00 | 1.50 | 1.50 |

Diesel Test Procedure D4

The catalysts were tested in an upflow tubular reactor. Each reactor tube contained 10 ml of catalyst mixed with an equal amount of SiC particles and sandwiched between layers of SiC particles. Before being tested the catalysts were pre-sulfided via liquid phase presulfiding using the feed described below which had been spiked with dimethyl disulfide to a total sulfur content of 3.7 wt. %. The presulfided catalysts were then tested in the hydrotreating of a diesel feedstock having the properties shown in Table 7:

TABLE 7

| GAS OIL FEEDSTOCK | |
|---|---|
| S (wt. %) | 1.1969 |
| N (ppmwt) | 102 |
| total aromatics (wt. %) | 28.3 |
| mono-aromatics (wt. %) | 16.5 |
| di-aromatics (wt. %) | 11.0 |
| tri+-aromatics (wt. %) | 0.8 |
| Simulated distillation ASTM-D 86 | |
| Initial boiling point | 178.4° C. |
| 5 vol. % | 211° C. |
| 10 vol. % | 224° C. |
| 30 vol. % | 261° C. |
| 50 vol. % | 283° C. |
| 70 vol. % | 309° C. |
| 90 vol. % | 348° C. |
| Final boiling point | 372° C. |

The catalysts were tested under the two conditions shown in Table 8:

TABLE 8

| | Presulfiding | Condition 1 | Condition 2 |
|---|---|---|---|
| Temperature (° C.) | 320 | 320 | 340 |
| Pressure (bar) | 45 | 45 | 20 |
| H2 to oil ratio (Nl/l) | 200 | 300 | 300 |
| LHSV (1/h) | 3.00 | 3.00 | 1.50 |

COMPARATIVE EXPERIMENT 1 (C1: Ni1.5Mo0.5W0.5 R3 EXTRUDATE)

115.2 g of $MoO_3$ (0.8 mole Mo, ex. Aldrich) and 200 g of tungstic acid $H_2WO_4$ (0.8 mole W, ex. Aldrich) were slurried in 6400 ml of water (suspension A) and heated to 90° C. 282.4 g of nickel hydroxycarbonate $2NiCO_3*3Ni(OH)_2*4\ H_2O$ (2.4 mole of Ni, ex. Aldrich) were suspended in 1600 ml of water and heated to 90° C. (suspension B). The nickel hydroxycarbonate used in this and the other examples had a B. E. T. surface area of 239 $m^2/g$. Suspension B was added to suspension A in 10 minutes, and the resulting mixture was maintained at 90° C. for a period of 16 hours (overnight) with continuous stirring. At the end of this time, the suspension was filtered. The yield was above 98% (based on the calculated weight of all metal components having been converted to their oxides). The obtained filter cake was wet-mixed with 2.5 wt % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The catalyst was sulphided and tested using the procedure from Diesel test procedure 2.

COMPARATIVE EXPERIMENT 2 (C2: Ni1.5Mo0.5W0.5 R3 CRUSHED)

The extrudates of catalyst of C1 were crushed and 40-60 mesh fraction was isolated by sieving. The material was then sulphided as described in C1 and tested using the Diesel test procedure 3.

COMPARATIVE EXPERIMENT 3 (C1: Ni1.5Mo0.5W0.5 R3 EXTRUDATE)

The extrudates of catalyst of C1 were sulphided and tested using the procedure from Diesel test procedures 1.

EXAMPLE 1 (E1: Ni1.5Mo1 R2 EXTRUDATE)

282.4 g of ammonium heptamolybdate $(NH_4)_6Mo_7O_{24}*4H_2O$ (1.6 mole Mo, ex. Aldrich) were dissolved in 6400 ml water, giving a solution with a pH of about 5.2 at room temperature. The solution was subsequently heated to 90° C. (solution A). 282.4 g of nickel hydroxycarbonate $2NiCO_3*3Ni(OH)_2*4H_2O$ (2.4 mole Ni, ex. Aldrich) were suspended in 1600 ml of water, and this suspension was heated to 90° C. (suspension B). Then suspension B was added to solution A in 10 minutes, and the resulting suspension was maintained at 90° C. for a period of 16 hours with continuous stirring. The yield was about 85%. The obtained filter cake was extruded (with 10 wt % binder), dried, calcined and sulphided as described in C1 and tested using the procedure from Diesel test procedure 2.

EXAMPLE 2 (E2: Ni3Mo1 R3 EXTRUDATE)

A catalyst was prepared as described in Comparative Experiment 1 (C1), except that only one Group VIB metal component was applied: a catalyst was prepared using 230.4 g of molybdenum trioxide (1.6 mole Mo, ex. Aldrich) and 564.8 g of nickel hydroxycarbonate $2NiCO_3*3Ni(OH)_2*4H_2O$ (4.8 mole Ni). The yield was about 98%, based on the calculated weight of all metal components having been converted to their oxides. The obtained filter cake was extruded (with 10 wt % binder), dried, calcined and sulphided as described in C1 and tested using the Diesel test procedure 2.

EXAMPLE 3 (E3: Ni2Mo1 Powder R3)

A catalyst was prepared as described in Comparative Experiment 1 (C1), except that only one Group VIB metal component was applied and that the preparation was carried out at a smaller scale: a catalyst was prepared using 28.8 g of molybdenum trioxide (0.2 mole Mo, ex. Aldrich) and 47.1 g of nickel hydroxycarbonate $2NiCO_3*3Ni(OH)_2*4H_2O$ (0.4 mole Ni). The yield was about 98%, based on the calculated weight of all metal components having been converted to their oxides. The resulting solid was dried at 120° C. for 16 hours (overnight) and calcined at 300° C. for 1 hour. The obtained material was pelletized, the pellets were crushed and 40-60 mesh fraction was isolated by sieving. The material was then sulphided as described in C1 and tested using the Diesel test procedure 3.

EXAMPLE 4 (E4: Ni3Mo1 POWDER R3)

A catalyst was prepared as described in Comparative Experiment 1 (C1), except that only one Group VIB metal component was applied and that the preparation was carried out at a smaller scale: a catalyst was prepared using 28.8 g of molybdenum trioxide (0.2 mole Mo, ex. Aldrich) and 70.6 g of nickel hydroxycarbonate $2NiCO_3*3Ni(OH)_2*4H_2O$ (0.6 mole Ni). The yield was about 98%, based on the calculated weight of all metal components having been converted to their oxides. The resulting solid was dried at 120° C. for 16 hours (overnight) and calcined at 300° C. for 1 hour. The obtained material was pelletized, the pellets were crushed and 40-60 mesh fraction was isolated by sieving. The material was then sulphided as described in C1 and tested using the Diesel test procedure 3.

EXAMPLE 5 (E5: Co2Mo1 POWDER R3)

A catalyst was prepared and tested as described in E3, except that instead of nickel hydroxycarbonate (0.4 mole Ni) cobalt hydroxycarbonate (0.4 mole Co) was used.

EXAMPLE 6 (E6: Ni1.5Mo1 R3 EXTRUDATE)

A catalyst was prepared as described in Comparative Experiment 1 (C1), except that only one Group VIB metal component was applied: a catalyst was prepared using 230.4 g of molybdenum trioxide (1.6 mole Mo, ex. Aldrich) and 282.4 g of nickel hydroxycarbonate $2NiCO_3*3Ni(OH)_2*4H_2O$ (2.4 mole Ni). The yield was about 98%, based on the calculated weight of all metal components having been converted to their oxides. The obtained filter cake was extruded (with 2.5 wt % binder), dried, calcined and sulphided as described in C1 and tested using the Diesel test procedure 1.

The full width at half maximum (FWHM) was measured for all examples and was found to be below 2.5 in all examples E1 to E6. The results in Table 9 show that the catalyst according to the invention achieves very low residual nitrogen levels. Hydrodenitrogenation activity, especially when expressed per unit weight is high compared to the prior art trimetallic bulk catalyst. Even when compared on the basis of volume activity, the activity is still good compared to the trimetallic bulk catalyst of the prior art. Clearly, the activity increases with increasing group VIII metal level. A comparison of condition 1 and 2 shows that hydrodenitrogenation results at higher pressures are improved to a surprising extent. The hydrodesulphurisation activity is relatively low but acceptable. The bulk catalyst according to the invention is particularly useful for use in combination with a very good hydrodesulphurisation catalyst. The high hydrodenitrogenation activity and ultra low residual nitrogen levels allow a hydrodesulphurisation catalyst to achieve much lower residual sulphur levels.

COMPARATIVE EXPERIMENT C4 (Ni1W0.5Mo0.5 R3)

188 g of nickel hydroxycarbonate $2NiCO_3*3Ni(OH)_2*4H_2O$ (1.6 mole of Ni) were suspended in 8000 ml of water and the resulting slurry was heated to 60° C. Subsequently 115.2 of $MoO_3$ (0.8 mole Mo) and 200 g of tungstic acid $H_2WO_4$ (0.8 mole W) were added and the resulting slurry was heated to 95° C. and maintained at that temperature for a period of about 24 hours with continuous stirring. At the end of this time, the suspension was filtered. The obtained filter cake was wet-mixed with 10 wt % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The extrudates were crushed and 40-60 mesh fraction was isolated by sieving. The material was then sulphided and tested using the Diesel test procedure D4.

COMPARATIVE EXPERIMENT C5

The method described in Example 1 in WO 2004/073859 was reworked. 12.8 g ADM (0.075 mole Mo) and 11.0 g $NiCO_3$ (0.092 mole Ni) were mixed and added to 112.5 g $H_2O$ in a 225 ml autoclave. The temperature was raised to 80° C. under pressure. 5.65 g ammonia (25 wt. % solution) was diluted with 37.5 g $H_2O$. 4.61 g Sipernat 2200 was dispersed in this solution. The autoclave was opened (there was no significant overpressure) and the silica slurry was added to the mixture in the autoclave. The autoclave was closed and heated to 80° C. and kept at 80° C. for 30 minutes. The autoclave was opened (there was no significant overpressure) and the solids were recovered by spray drying under conditions assuring that the solids were not exposed to temperatures above 300° C. (actual temperature did not exceed 180° C.). Due to the application of spray-drying, the yield of the preparation should be 100%. This corresponds to the (calculated) composition of 48.4 wt. % $MoO_3$, 30.9 wt. % NiO and 20.7 wt. % $SiO_2$. The resulting solid was pelleted, the pellets were crushed and 40-60 mesh fraction was isolated by sieving. The material was then calcined at 300° C. for 1 hour. The material was then sulphided and tested using the Diesel test procedure D4.

Figure 1:
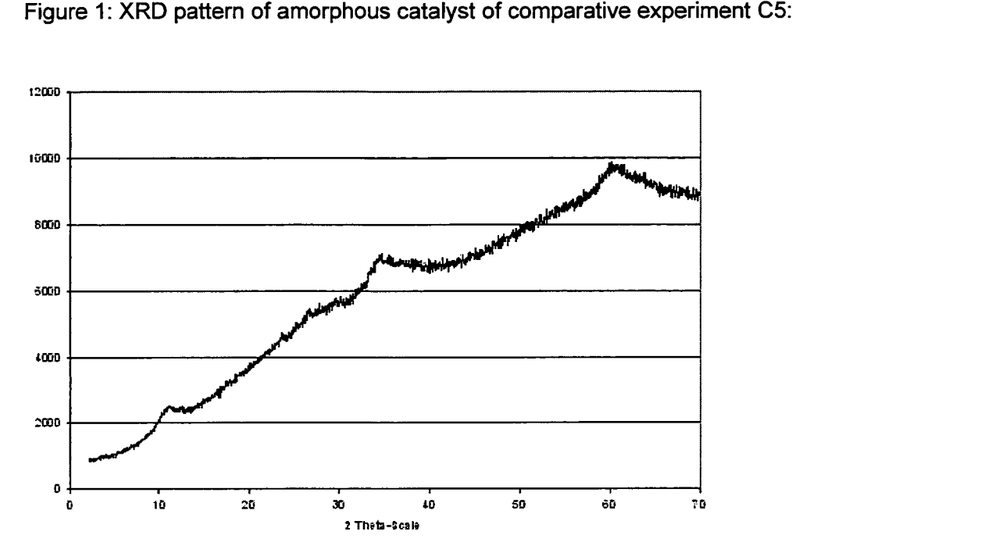
FIG. 1 illustrates the XRD pattern of the amorphous catalyst of Comparative experiment C5.
Figure 2:
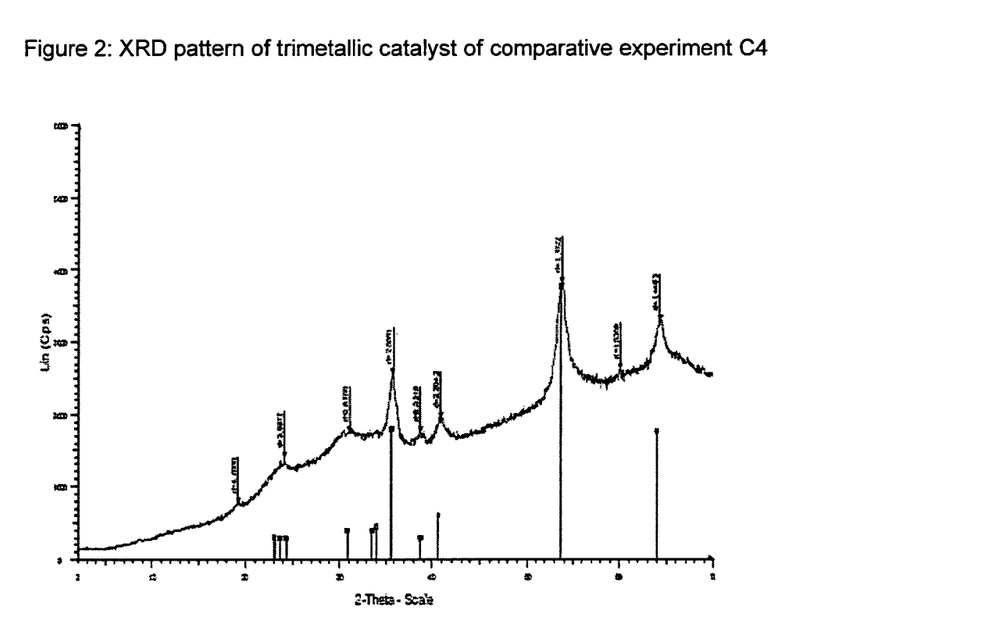
FIG. 2 shows the XRD pattern of the trimetallic catalyst of Comparative experiment C4.
Figure 3:
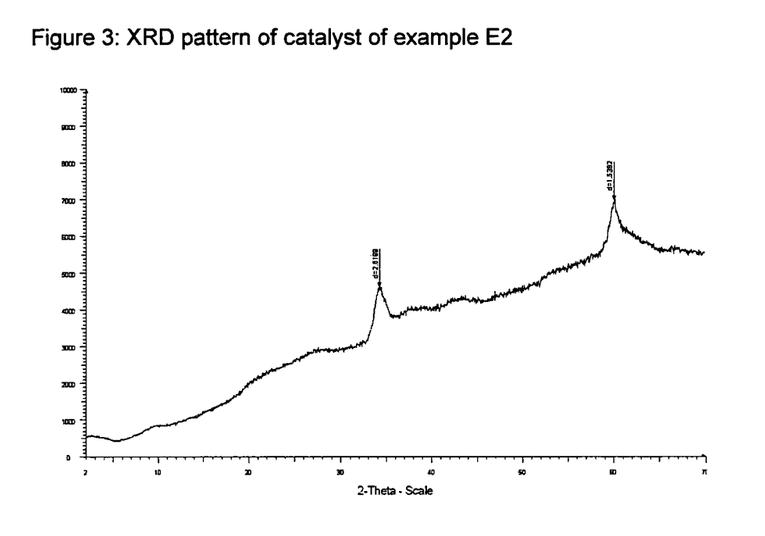
FIG. 3 represents the XRD pattern of the catalyst in Example E2.

The XRD diffraction pattern of the spray dried composition of comparative experiment C5 is shown in FIG. 1. The XRD shows the lack of any sharp reflections having a FWHM below 2.5, which indicates that the composition is XRD-amorphous, as opposed to the catalysts according to the invention. In FIGS. 2 and 3, the trimetallic catalyst of comparative example C4 and the catalyst according to the invention of example E2 are shown. The comparison of the XRD's in FIGS. 1, 2 and 3 clearly shows the differences as described above of the prior art amorphous NiMo catalyst, the prior art trimetallic catalyst and the catalyst according to the invention. The activity test results also show that the catalyst according to the invention has a significantly higher denitrogenation activity and a lower residual nitrogen content than the amorphous catalyst of comparative example C4.

COMPARATIVE EXPERIMENT C6

The method described in Example 6 in WO 2004/073859 was reworked. 174 g Ni(NO3)2.6H20 (0.6 mole Ni) and 102.5 g ADM (0.6 mole Mo) were dissolved in 1200 ml H2O at room temperature. During heating to 80° C. 25.5 g HNO3 was added. Clear solution, having a pH of 2.56, was obtained. 36.9 g Sipernat 2200 was dispersed in 300 g H2O and heated to 80 0C. The silica suspension was added to the metal solution. 7 wt % NH4OH was added slowly until pH 6.8 when precipitation occurs. After about 30 minutes after the addition of silica to the metals solution, the suspension was filtered. The filter cake was washed. Due to the Mo loss in the filtrate, the composition of the resulting solid was 31.2 wt. % MoO3, 32.0 wt. % NiO and 36.8 wt. % SiO2. The resulting solid was dried at 120° C. for 16 hours (overnight). The obtained material was pelleted, the pellets were crushed and 40-60 mesh fraction was isolated by sieving. The material was then calcined at 300° C. for 1 hour. The material was then sulphided and tested using the Diesel test procedure D4.

The XRD diffraction pattern of the dried solid shows the lack of any sharp reflections, which indicates that the composition is fully XRD-amorphous.

TABLE 9 test results

| exp. nr | catalyst | test powder | test extrudates | CBD loaded | N1 | RWA HDN1 | RVA HDN1 | N2 | RWA HDN2 |
|---|---|---|---|---|---|---|---|---|---|
| C1 | Ni1.5Mo0.5W0.5R3 | | D2 | 1.39 | 0.4 | 100 | 100 | 2 | 100 |
| E1 | Ni1.5Mo1R2 | | D2 | 0.96 | 0.5 | 148 | 97 | 10 | 93 |
| E2 | Ni3Mo1R3 | | D2 | 0.94 | 0.6 | 146 | 94 | 12 | 85 |
| E3 | Ni2Mo1R3 | D3 | | 0.93 | 0.5 | 147 | 96 | 13 | 80 |
| E4 | Ni3Mo1R3 | D3 | | 0.93 | 0.4 | 154 | 100 | 14 | 77 |
| E5 | Co2Mo1R3 | D3 | | 1.06 | 0.4 | 135 | 100 | 10 | 80 |
| C2 | Ni1.5Mo0.5W0.5R3 | D3 | | 1.43 | 19 | 100 | 100 | 2 | 100 |
| E6 | Ni1.5Mo1R3 | | D1 | 0.77 | 0.6 | 169 | 93 | 13.1 | 104 |
| C3 | Ni1.5Mo0.5W0.5R3 | | D1 | 1.39 | 0.4 | 100 | 100 | 3.4 | 100 |
| C4 | Ni1Mo0.5W0.5R3 | | D4 | 1.25 | 0.5 | 100 | 100 | 3.7 | 100 |
| C5 | WO 2004/073859 rework Example 1 | | D4 | 0.99 | 44.1 | 21 | 16 | 50.6 | 30 |
| C6 | WO 2004/073859 rework Example 6 | | D4 | 1.10 | 26.2 | 31 | 26 | 36 | 40 |

| exp. nr | catalyst | RVA HDN2 | S1 | RWA HDS1 | RVA HDS1 | S2 | RWA HDS2 | RVA HDS2 |
|---|---|---|---|---|---|---|---|---|
| C1 | Ni1.5Mo0.5W0.5R3 | 100 | 23 | 100 | 100 | 24 | 100 | 100 |
| E1 | Ni1.5Mo1R2 | 61 | 247 | 51 | 33 | 131 | 71 | 46 |
| E2 | Ni3Mo1R3 | 54 | 531 | 35 | 22 | 146 | 69 | 44 |
| E3 | Ni2Mo1R3 | 52 | 31 | 63 | 41 | 167 | 57 | 37 |
| E4 | Ni3Mo1R3 | 50 | 17 | 82 | 53 | 166 | 57 | 37 |
| E5 | Co2Mo1R3 | 59 | 19 | 67 | 50 | 48 | 89 | 66 |
| C2 | Ni1.5Mo0.5W0.5R3 | 100 | 4 | 100 | 100 | 0.4 | 100 | 100 |
| E6 | Ni1.5Mo1R3 | 58 | 160 | 59 | 33 | 132 | 82 | 45 |
| C3 | Ni1.5Mo0.5W0.5R3 | 100 | 13 | 100 | 100 | 23 | 100 | 100 |
| C4 | Ni1Mo0.5W0.5R3 | 100 | 149 | 100 | 100 | 23 | 100 | 100 |

TABLE 9-continued

| | | | test results | | | | | |
|---|---|---|---|---|---|---|---|---|
| C5 | WO 2004/073859 rework Example 1 | 22 | 2652 | 24 | 18 | 773 | 24 | 18 |
| C6 | WO 2004/073859 rework Example 6 | 33 | 1911 | 28 | 23 | 377 | 32 | 26 |

The invention claimed is:

1. A bulk catalyst comprising at least 60 wt % metal oxidic particles comprising one or more Group VIII metals and molybdenum, the bulk catalyst comprising less than 10 mole % of any Group VIB metal other than molybdenum (relative to the total amount of Group VIB metals) and a Group V metal in an amount less than 10 mole % (relative to the total of the Group VIB metals), which bulk catalyst has been calcined at a temperature below a temperature where the hexagonal metastable crystal structure changes to an inactive crystalline structure, and which bulk catalyst has a metastable hexagonal phase characterized by an X-ray diffraction pattern having reflections at 33-35 and 58-61° 2θ.

2. The bulk catalyst according to claim 1, wherein the Group VIII to Group VIB metal molar ratio is above 1.5.

3. The bulk catalyst according to claim 1, wherein the Group VIII to Group VIB metal mole ratio is between 2.5 and 5.

4. The bulk catalyst according to claim 1, wherein the main reflections have a full width at half maximum (FWHM) of less than 2.5.

5. The bulk catalyst according to claim 1, wherein the Group V metal is niobium.

6. The bulk catalyst according to claim 1, wherein the metal oxidic particles substantially comprise only one group VIII metal.

7. A process for the manufacture of the bulk catalyst according to claim 1, comprising
(i) preparing a reaction mixture of a protic liquid, one or more first metal compounds comprising one or more Group VIII metals and a second metal compound comprising molybdenum, and less than 10 mole % of any other Group VIB metal (relative to the total amount of Group VIB metals), and/or a Group V metal in an amount less than 10 mole % (relative to the total of the Group VIB metals),
(ii) reacting the first and second metal compounds at elevated temperature whereby the first and/or the second solid metal compounds remain at least partly in the solid state during the entire reaction to form the metal oxidic particles,
wherein the bulk catalyst in all stages during its preparation remains at a temperature below a temperature where the hexagonal metastable crystal structure changes to an inactive crystalline structure.

8. The process according to claim 7 wherein the first metal compound and the second metal compound remain at least partly in the solid state during the entire reaction.

9. The process according to claim 8, wherein the first metal compound is a metal hydroxy carbonate or carbonate and the second metal compound is a metal oxide or acid.

10. The process according to claim 9, wherein the first compound is a nickel carbonate or hydroxy-carbonate having a surface area of at least 150 m²/g.

11. A process for the manufacture of the bulk catalyst according to claim 1, comprising
(i) forming a solution of one or more first soluble metal compounds comprising one or more Group VIII metals and a second soluble metal compound comprising molybdenum, and less than 10 mole % (relative to the total amount of Group VIB metals) and/or a Group V metal in an amount less than 10 mole % (relative to the total of the Group VIB metals),
(ii) reacting and/or precipitating the first and second metal compounds to form the metal oxidic particles,
wherein the bulk catalyst in all stages during its preparation remains at a temperature below a temperature where the hexagonal metastable crystal structure changes to an inactive crystalline structure.

12. The process according to claim 7, wherein the protic liquid is water and the reaction is done in hydrothermal conditions at a reaction temperature above the boiling temperature of the protic liquid.

13. The process according to claim 7, wherein the first and second solid metal compounds are free from nitrogen atoms and wherein the protic liquid separated from the reacted metal oxidic particles in step iii) is re-used at least in part to form the slurry in step i).

14. The process according to claim 7 further comprising one or more of the following process steps:
(i) separating the metal oxidic particles from the reaction mixture,
(ii) compositing the metal oxidic particles with 0 to 40 wt % of one or more materials selected from the group of binder materials, conventional hydroprocessing catalysts, acidic promoters and cracking compounds before, during or after the combining and/or reacting of the metal compounds,
(iii) spray-drying, (flash) drying, milling, kneading, slurry-mixing, dry or wet mixing, or combinations thereof,
(iv) shaping,
(v) drying and/or thermally treating at a temperature below a temperature where transition to a crystalline structure occurs, and
(vi) sulphiding.

15. A process for hydroprocessing of a hydrocarbon feedstock comprising sulphur and nitrogen containing organic compounds comprising the step of contacting the hydrocarbon feedstock with the catalyst of claim 1.

* * * * *

UNITED STATES PATENT AND TRADEMARK OFFICE
CERTIFICATE OF CORRECTION

PATENT NO.       : 8,486,259 B2
APPLICATION NO. : 12/091328
DATED            : July 16, 2013
INVENTOR(S)      : Eijsbouts-Spickova et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1300 days.

Signed and Sealed this
Eighth Day of September, 2015

Michelle K. Lee
*Director of the United States Patent and Trademark Office*